United States Patent
Choubal et al.

(10) Patent No.: US 7,165,144 B2
(45) Date of Patent: Jan. 16, 2007

(54) MANAGING INPUT/OUTPUT (I/O) REQUESTS IN A CACHE MEMORY SYSTEM

(75) Inventors: Ashish V. Choubal, Austin, TX (US); Christopher T. Foulds, Austin, TX (US); Madhu R. Gumma, Austin, TX (US); Quang T. Le, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 453 days.

(21) Appl. No.: 10/805,105

(22) Filed: Mar. 19, 2004

(65) Prior Publication Data

US 2005/0210202 A1    Sep. 22, 2005

(51) Int. Cl.
*G06F 12/00* (2006.01)

(52) U.S. Cl. ............... 711/118; 711/138; 711/144; 711/145; 711/154

(58) Field of Classification Search ............ 711/118, 711/138, 144, 145, 154
See application file for complete search history.

(56) References Cited

U.S. PATENT DOCUMENTS

| | | | | |
|---|---|---|---|---|
| 4,956,803 A | * | 9/1990 | Tayler et al. | 711/113 |
| 5,608,892 A | * | 3/1997 | Wakerly | 711/118 |
| 5,729,713 A | * | 3/1998 | Leyrer | 711/138 |
| 5,809,550 A | * | 9/1998 | Shukla et al. | 711/167 |
| 5,875,466 A | * | 2/1999 | Wakerly | 711/138 |
| 5,918,069 A | * | 6/1999 | Matoba | 710/21 |
| 6,131,155 A | * | 10/2000 | Alexander et al. | 712/207 |
| 6,356,980 B1 | * | 3/2002 | Arimilli et al. | 711/138 |
| 6,922,754 B1 | * | 7/2005 | Liu et al. | 711/138 |
| 2001/0052053 A1 | * | 12/2001 | Nemirovsky et al. | 711/138 |

OTHER PUBLICATIONS

Chi et al., "Improving Cache Performance by Selective Cache Bypass," pp. 277-285, IEEE, 1989.*
"Summary: The Cache Read/Write Process," URL:http://www.pcguide.com/ref/mbsys/cache/funcSummary-c.html; copyright 1997-2001 Charles M. Kozierok; 2 pp.
"Cache Memory," URL: http://cmedia.glos.ac.uk/gbs/CL/howcomp/ncachmem.htm; download date Mar. 7, 2004; 6 pp.

* cited by examiner

*Primary Examiner*—Stephen C. Elmore
(74) *Attorney, Agent, or Firm*—Davis W. Victor; Konrad Raynes & Victor LLP (57) ABSTRACT

Provided are a method, system, and program for managing Input/Output (I/O) requests in a cache memory system. A request is received to data at a memory address in a first memory device, wherein data in the first memory device is cached in a second memory device. A determination is made as to whether to fetch the requested data from the first memory device to cache in the second memory device in response to determining that the requested data is not in the second memory device. The requested data in the first memory device is accessed and the second memory device is bypassed to execute the request in response to determining not to fetch the requested data from the first memory device to cache in the second memory device.

35 Claims, 5 Drawing Sheets

FIG. 6

MANAGING INPUT/OUTPUT (I/O) REQUESTS IN A CACHE MEMORY SYSTEM

BACKGROUND

In a cache memory system, data stored in a volatile or non-volatile memory device may be cached in a faster access memory device having less space. For instance, data from a slower access main memory device in a system may be cached in a faster access L1 cache that is resident on the processor or L2 cache that is resident on the motherboard. In an associative cache, bytes at memory addresses in the slower access memory device are associated with different cache lines in the faster access device. In prior art cache systems, if a read request is directed to data in the slower access device that is available in the faster access cache, then the requested data is returned from the faster access cache, improving read access performance. However, in prior art write back cache systems, if the cache location for the requested data does not include the requested data and instead includes updated data to a different memory address, then the updated data in cache is written back to the slower access memory device and the requested data is fetched from the slower access memory device to return to the read request and to store in the cache in anticipation of future read accesses.

If a write request is directed to data in the slower access device that is available in the faster access cache, then the write data is written to the cache location for the write data, improving write performance. However, in prior art write back cache systems, if the cache location for the data to update with the write does not include the data to update and instead includes updated data to a different memory address, then the updated data already in cache is written back to the slower access memory device and the data in the write request is written to the cache. Further, before writing the data to cache, the data subject to the write request may be fetched from the slower access memory device to the cache before the write is applied.

In prior art write back systems, data that is frequently accessed and maintained in cache may be written back to the main memory device in response to write or read requests to other memory addresses that are cached at the same cache location. Such frequently requested data that is written back will likely have to be re-fetched back into cache in response to another request for the data. Substantial cache resources must be consumed to continuously prefetch frequently accessed data that is removed and returned to cache.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
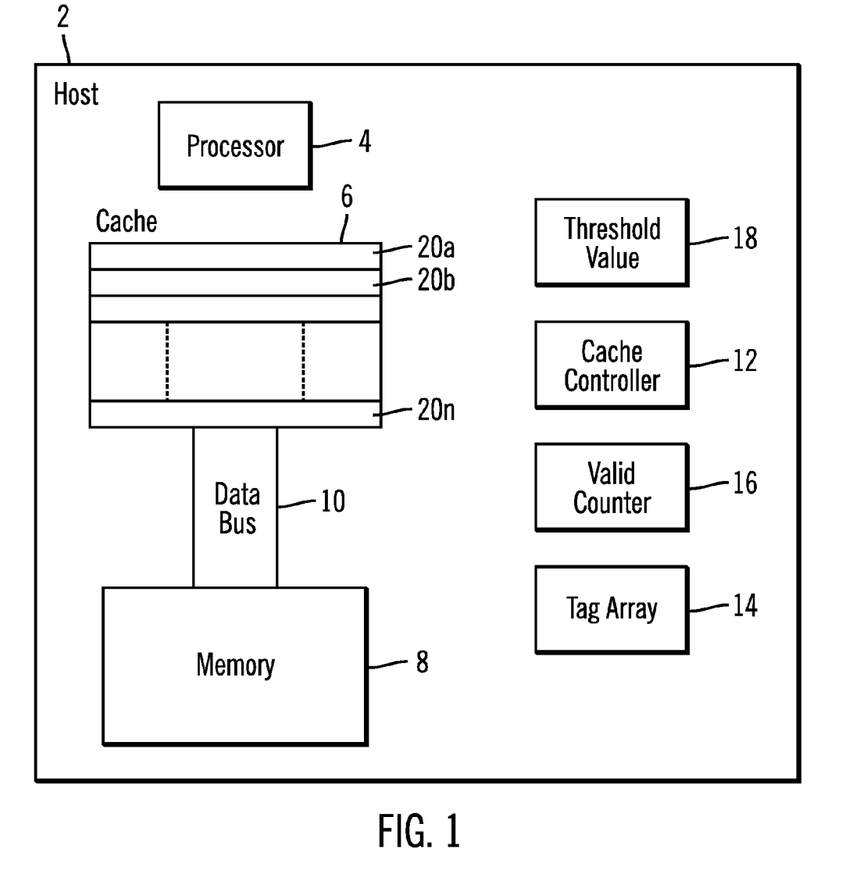
FIG. 1 illustrates a computing environment in accordance with the described embodiments.

FIG. 1 illustrates a computing environment in which embodiments are implemented. A host system 2 includes a processor 4, a cache memory 6 and a memory 8, where the cache 6 may be a faster access memory device than the memory 8. For instance, the cache 6 may comprise an L1 cache that is on the processor 4 chip or an L2 cache resident on the motherboard of the host 2 and the memory 8 a volatile memory device, such as a Random Access Memory (RAM) or similar type device, that takes longer to access than cache 6. Data is transferred between the cache 6 and memory 8 over a data bus 10. A cache controller 12 performs cache management operations and maintains a tag array 14, valid counter 16, and threshold value 18 to manage data from the memory 8 in the cache 6.

The host 2 may comprise any computing device known in the art, such as a server, workstation, handheld computer device, mainframe etc. Alternatively, the processor and high speed cache may be on an Input/Output (I/O) device, such as a printer, network adaptor card, etc., and the slower access memory may be external to the I/O device, where data in the external memory is buffered in the higher speed access cache for processing by the adaptor.

In certain embodiments, the cache 6 is organized as a plurality of cache lines 20a, 20b . . . 20n, where each cache line is capable of storing data from the memory 8. In certain embodiments, the number of memory addresses whose data may be stored in one cache line 20a, 20b . . . 20n at a time may comprise the byte size of the cache 6 divided by the number of cache lines 20a, 20b . . . 20n, which is the number of bytes per cache line 20a, 20b . . . 20n. For example, the cache 6 may be 32 KB (Kilo Bytes) divided into 256 cache lines 20a, 20b . . . 20n, where each cache line is 128 bytes and can store 128 memory bytes from memory 8 at a time. However, a number of memory bytes greater than the size of a cache line may map to a single cache line. This requires that memory addresses be removed from a cache line to make room for a requested memory address in a cache line.

Figure 2:
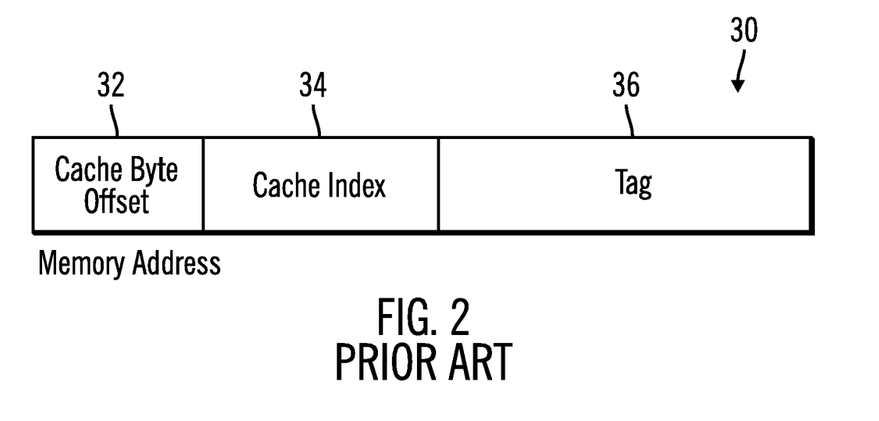
FIG. 2 illustrates a memory address format known in the art.

FIG. 2 illustrates a format of a memory address 30. Each memory address 30 includes:

Cache Offset 32: indicates the byte offset in the cache line 20a, 20b . . . 20n in which the byte at the memory address 30 in the memory 8 is cached. In embodiments where each cache line 20a, 20b . . . 20n has 128 bytes, the cache offset 32 is seven bits to provide every possible offset value into the cache line 20a, 20b . . . 20n in which that memory 8 byte is cached.

Cache Index 34: a value that identifies the cache line 20a, 20b . . . 20n into which the byte at the memory address 30 is cached. In embodiments where there are 256 cache lines 20a, 20b . . . 20n, the cache index 34 is eight bits to provide every possible cache index value into which a byte may be cached.

Tag 36: a value that provides a further identifier of the byte in memory 8, which in combination with the cache offset 32 and cache index 34 is capable of providing every possible memory address value in the memory 28. Each cache line 20a, 20b . . . 20n is capable of storing data for addresses having a same cache index 34 value, but that have different cache offset 32 and tag 36 values. In certain embodiments, the data in a cache line 20a, 20b . . . 20n at one time shares the same tag 36 address and cache index 34 portions, but has different cache offset 32 values indicating their byte in the cache line 20*a*, 20*b* . . . 20*n*. Thus, when data is fetched into a cache line 20*a*, 20*b* . . . 20*n*, the cache controller 12 fetches all bytes having the same cache index 34 and tag address 36 portions.

Figure 3:
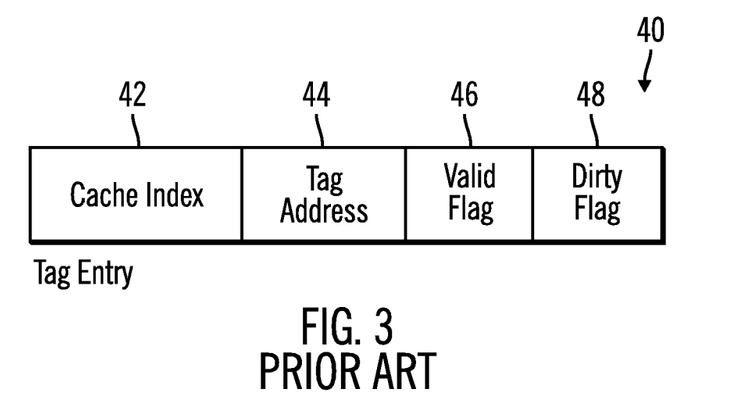
FIG. 3 illustrates information included in a tag array known in the art.

FIG. 3 illustrates an entry 40 in the tag array 14 providing information on the bytes currently stored in one cache line 20*a*, 20*b* . . . 20*n*, where there is one entry 40 in the tag array 14 for each cache line 20*a*, 20*b* . . . 20*n*. Each entry 40 includes:

Cache Index 42: indicates the cache line 20*a*, 20*b* . . . 20*n* for which information is provided. Alternatively, this information may be determined by the tag entry number in the tag array 14.

Tag Address 44: indicates the tag address 36 of the memory addresses of the bytes currently in the cache line 20*a*, 20*b* . . . 20*n*.

Valid Flag 46: indicates whether valid data is in the cache line 20*a*, 20*b* . . . 20*n*.

Dirty Flag 48: indicates whether an updated byte is in the cache line 20*a*, 20*b* . . . 20*n*, where the updated byte in the cache line is newer than the copy of that byte in the memory address in the memory 8.

Figure 4:
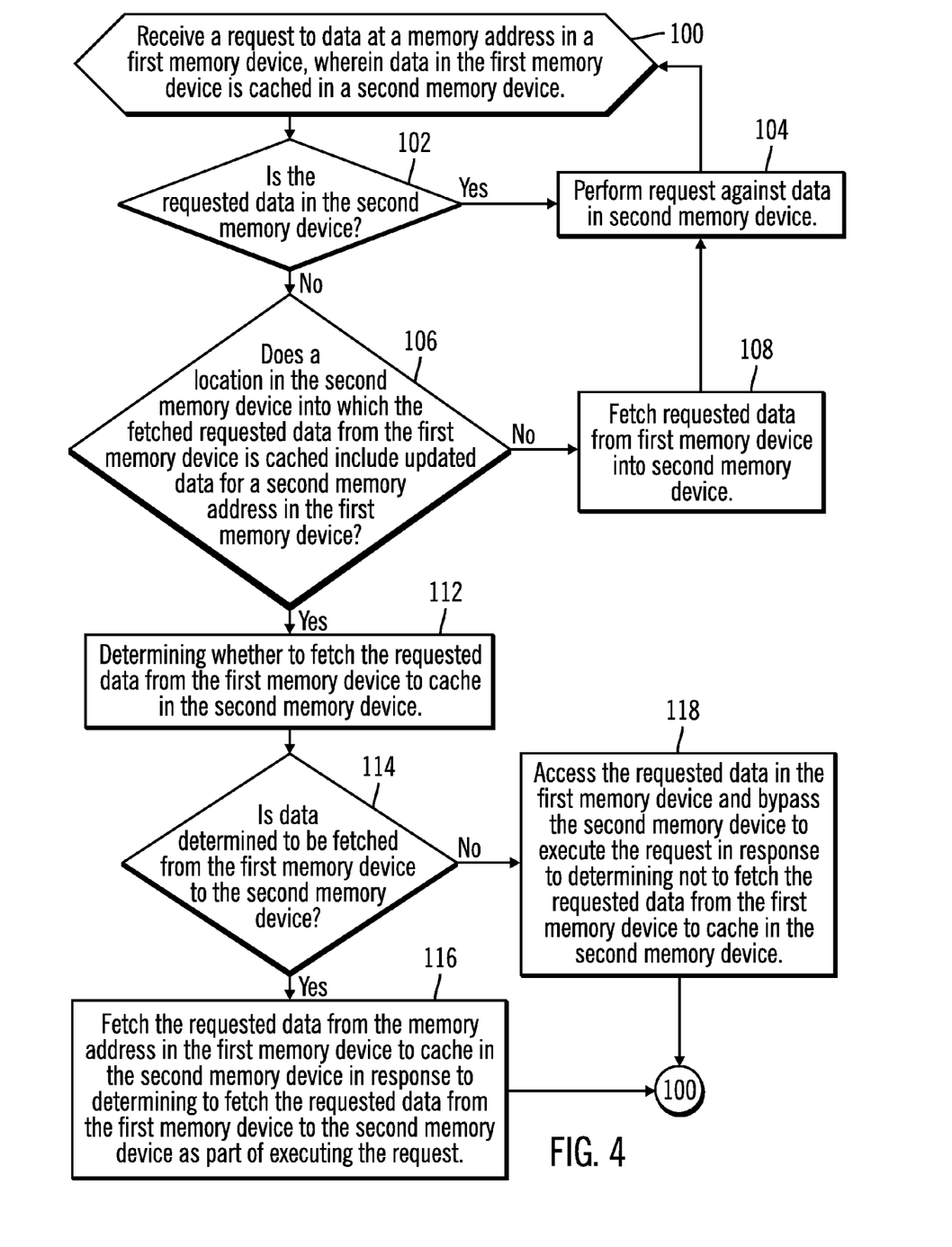
FIGS. 4, 5, and 6 illustrate operations to manage data in a cache memory in accordance with the described embodiments.

FIG. 4 illustrates operations performed by the cache controller 12 to perform cache related operations in accordance with the described embodiments. A request is received (at block 100) to data, such as a byte, at a memory address in a first memory device, wherein data in the first memory device is cached in a second memory device. The first memory device may comprise the slower access memory 8 and the second memory device may comprise the faster access cache 6. The request may comprise a read or write request to a byte in memory 8 identified by a memory address having the memory address format 30 (FIG. 2). A determination (at block 102) is made of whether the requested data is in the second memory device. This determination may be done by comparing the tag 36 portion of the requested memory address with the tag address 44 in the tag entry 40 for the cache line 20*a*, 20*b* . . . 20*n* in which the byte having the requested address would be cached. The cache line 20*a*, 20*b* . . . 20*n* or cache index 42 is identified by the cache index 34 in the memory address of the requested byte. If the tag portion 36 of the requested memory address matches the tag address 44 in the tag entry 40 and the valid flag 46 is "on", then the requested data, i.e., data subject to the read or write request, is in cache, else the current version of the requested data is in the memory 8. If (at block 102) the requested data is in the second memory device, e.g., cache 6, then the request, i.e., read or write, is performed (at block 104) against the data in the second memory device.

If (at block 102) the requested data is not in the second memory device, then a determination is made (at block 106) of whether a location in the second memory device into which the fetched requested data from the first memory device is cached includes updated data for the first memory device. This determination at block 106 may be made by checking the dirty flag 48 in the tag entry 40 for the cache line 20*a*, 20*b* . . . 20*n* into which the requested byte is cached, which is the tag entry 40 having a cache index 42 value matching the cache index 34 value in the requested memory address. If the dirty flag 48 is "on", then the cache line 20*a*, 20*b* . . . 20*n* includes updated data, else the cache line 20*a*, 20*b* . . . 20*n* does not include updated data. If (at block 106) the location in the second memory device does not include updated data, then the cache controller 12 fetches (at block 108) the requested data from the first memory device into the second memory device and then proceeds to block 104 to perform the requested operation against the requested data. In certain embodiments, if the request is a read, the data fetched from the first memory device is returned to a read. If the request is a write, then after fetching the data into the second memory device, e.g., cache 6, the write is performed against the cached data in the cache 6.

Figure 5:
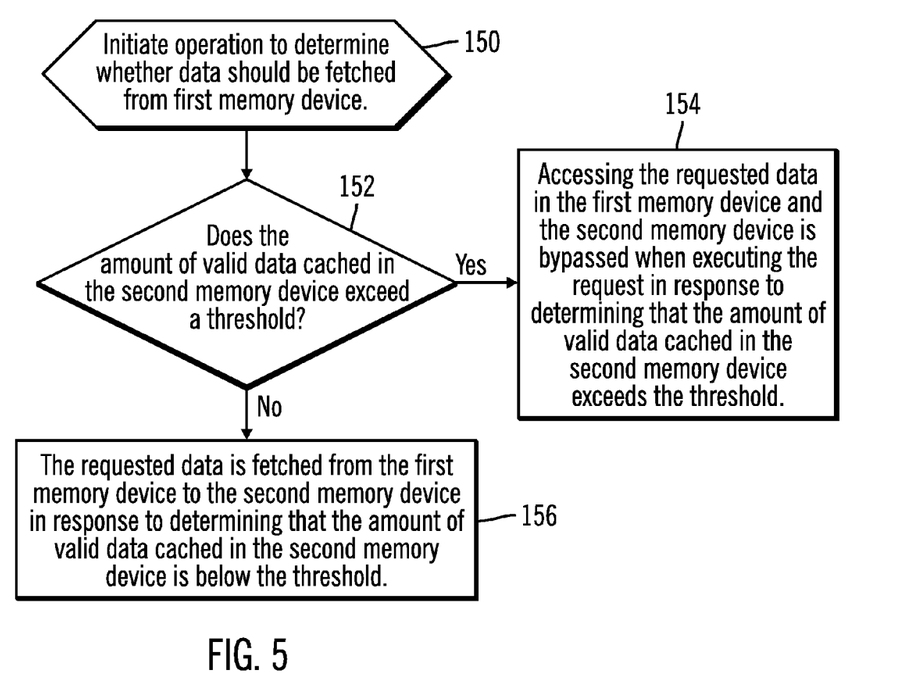
Figure 6:
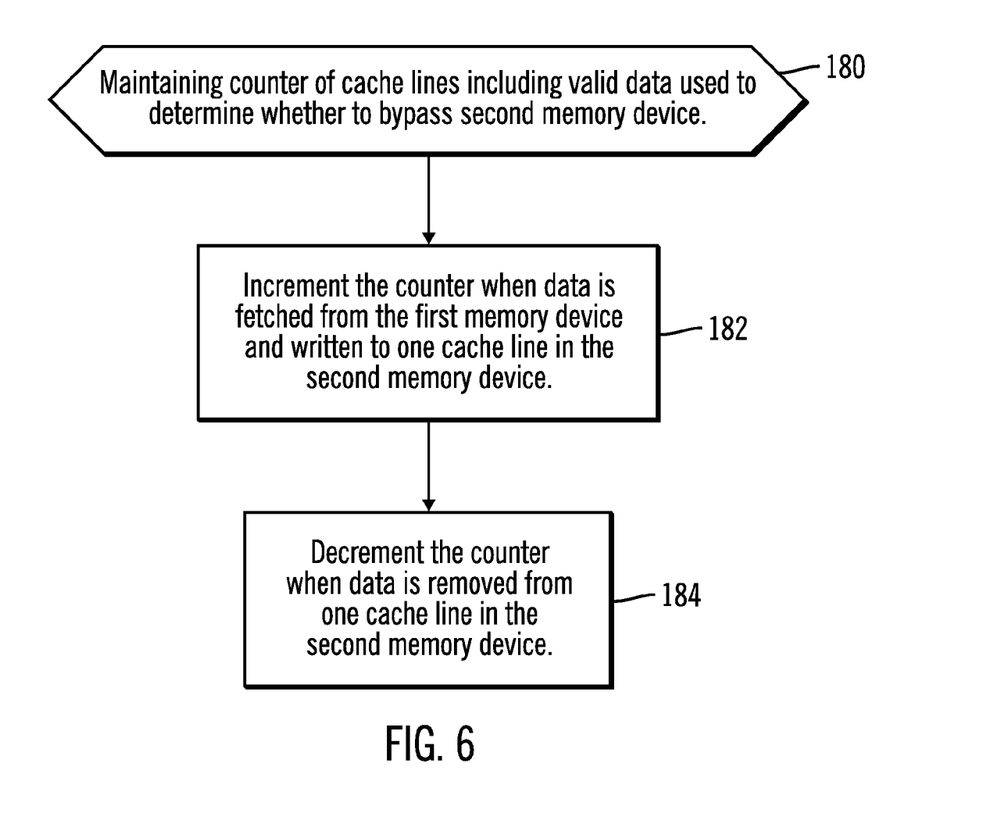

If (at block 106) the location of the requested data in the second memory device includes updated data, then a determination is made (at block 112) of whether to fetch the requested data from the first memory device to cache in the second memory device. In certain embodiments, this determination may be made by determining whether an amount of valid data in the cache 6 exceeds a threshold, i.e., the number of cache lines 20*a*, 20*b* . . . 20*n* having their valid flag 46 "on" exceeds a threshold. FIGS. 5 and 6, discussed below, provide further details on how this valid data/threshold comparison may be made. If (at block 114) the determination is made to fetch the data from the first memory device to second memory device, e.g., cache 6, then the cache controller 12 fetches (at block 116) the requested data from the memory address in the first memory device to the second memory device, e.g., the cache 6, in response to determining to fetch the requested data from the first memory device to the second memory device as part of executing the request. Otherwise, if (at block 114) the determination is made to not fetch the requested data from the first memory device, the requested data is accessed (at block 118) in the first memory device and the second memory device is bypassed when executing the request. After processing the I/O request at block 116 or 118, control returns to block 100 to wait for further I/O requests to process.

FIG. 5 illustrates one embodiment for determining whether to bypass the cache 6 or fetch data from the memory 8 to cache 6 in the event of a read or write miss. Control begins at block 150 to perform the determination at block 112 in FIG. 4, i.e., whether data should be fetched from the first memory device to the second memory device. If (at block 152) the amount of valid data cached in the second memory device exceeds a threshold, then the requested data is accessed (at block 154) in the first memory device and the second memory device is bypassed when executing the request. At block 154, the read or write is performed directly on the data in the slower access memory 8 and the cache 6 is bypassed. If (at block 152) the amount of valid data cached in the second memory device does not exceed the threshold, then the requested data is fetched (at block 156) from the first memory device to the second memory device.

In certain embodiments, the amount of valid data may be determined by the number of cache lines 20*a*, 20*b* . . . 20*n* having valid data, or the number of cache lines having a valid flag 46 "on". If the number of cache lines 20*a*, 20*b* . . . 20*n* having valid data does not exceed the threshold, then the byte for which there was a dirty write miss or a dirty read miss in cache 6 is fetched from the memory device 8 into the cache 6. In certain embodiments, if the number of cache lines 20*a*, 20*b* . . . 20*n* having valid data does exceed a threshold, then the byte for which there was a dirty write or read miss in cache 6 is not fetched, and the read or write operation is performed directly against the slower access memory device 8, bypassing the cache 6.

FIG. 6 illustrates operations performed by the cache controller 12 in certain embodiments where the amount of valid data in cache 6 may be determined by maintaining (at block 180) a valid counter 16 indicating the number of cache lines 20*a*, 20*b* . . . 2*n* (FIG. 1) having valid data, which is compared against the threshold value 18 indicating a number of cache lines. The threshold value 18 may be programmable. The counter, e.g., valid counter 16, is incremented (at block 182) when data is fetched from the first memory device and written to one cache line 20a, 20b . . . 20n in the second memory device. Additionally, the counter is decremented (at block 184) when data is removed or invalidated in one cache line 20a, 20b . . . 20n in the second memory device. In an additional embodiment, the valid counter 16 may be incremented when the valid flag 16 is changed from indicating invalid to indicating valid and decremented when the valid flag 16 is changed from indicating valid to indicating invalid.

In certain embodiments, the determination of whether to fetch based on whether the amount of valid data exceeds a threshold can be made by a signal that is asserted when the valid counter 16 reaches the threshold, and de-asserted when the valid counter 18 falls below the threshold.

In certain embodiments, a technique is provided to bypass the faster cache and perform the read or write operation directly against the slower access memory device in the event of a dirty read miss or a dirty write miss if the amount of valid data already in the cache exceeds a threshold. The threshold may be based on empirical observations such that the threshold indicates the point at which the cache 6 is sufficiently filled with valid data such that there is a significant likelihood that the data currently in the cache 6 will be frequently accessed. In such case, in the event that such frequently accessed data is removed from the cache to fetch in other data in response to a dirty read miss or dirty write miss, this removed frequently accessed data will likely have to be re-fetched in response to a subsequent access attempt. This results in the continual removal and re-fetching of frequently accessed data from cache, which further results in excessive thrashing of external memory accesses and resources. The described embodiments reduce the likelihood of such thrashing of external memory accesses by bypassing the cache in order to reduce the likelihood that frequently accessed data will be removed from cache. Reducing such thrashing conserves both cache and the external memory resources.

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In the described embodiments, both the cache and the external memory comprised memory devices. In additional embodiments, the cache may cache data from a non-volatile storage device, such as a magnetic disk drive. Alternatively, the memory devices may both comprise non-volatile storage type devices.

In certain described embodiments, an example of the number of bytes in each cache lines and number of cache lines was provided. However, the described implementations may apply to memory and cache devices having any number of bytes, and with memory addresses of different lengths.

The described embodiments were discussed with respect to a cache system that utilized certain information in the memory address to determine the cache location in which bytes from memory are stored. In alternative embodiments, different techniques may be used to associate memory bytes with cache locations.

FIG. 3 illustrates an example of information included in a tag array entry. Additionally, the tag array information may be stored in a different format than shown in FIG. 4 with additional or less information on the cache lines.

In certain embodiments, the cache and operations performed thereon may be implemented on the processor integrated circuit, such as an on-board L1 cache. In alternative embodiments, the cache and operations performed thereon may be implemented on an integrated circuit that is separate from the processor integrated circuit substrate that accesses the cache.

The illustrated operations of FIGS. 4, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   receiving a request to data at a memory address in a first memory device, wherein data in the first memory device is cached in a second memory device;
   determining whether to fetch the requested data from the first memory device to cache in the second memory device in response to determining that the requested data is not in the second memory device; and
   accessing the requested data in the first memory device and bypassing the second memory device to execute the request in response to determining not to fetch the requested data from the first memory device to cache in the second memory device.

2. The method of claim 1, wherein the memory address to which the request is directed comprises a first memory address, wherein the determination to fetch the requested data from the first memory device is made in response to additionally determining that a location in the second memory device into which the fetched requested data from the first memory device is cached includes updated data for the first memory device.

3. The method of claim 1, wherein the request may comprise a request to read or write data at the memory address in the first memory device.

4. The method of claim 1, further comprising:
   fetching the requested data from the memory address in the first memory device to cache in the second memory device in response to determining to fetch the requested data from the first memory device to the second memory device as part of executing the request.

5. The method of claim 1, wherein determining whether to fetch the requested data from the first memory device to the second memory device in response to determining that the requested data is not in the cache comprises:
   determining whether an amount of valid data from the first memory device cached in the second memory device exceeds a threshold.

6. The method of claim 5, wherein the requested data is fetched from the first memory device to the second memory device in response to determining that the amount of valid data cached in the second memory device is below the threshold and wherein the requested data is accessed in the first memory device and the second memory device bypassed when executing the request in response to determining that the amount of valid data cached in the second memory device exceeds the threshold.

7. The method of claim 5, further comprising:
   incrementing a counter whenever data is fetched from the first memory device and cached in the second memory device; and
   decrementing the counter whenever data is invalidated in the second memory device, wherein determining whether the amount of valid data from the first memory device being cached in the second memory device exceeds the threshold comprises determining whether the counter exceeds the threshold and determining whether the amount of valid data in the second memory device is below the threshold comprises determining whether the counter is below the threshold.

8. The method of claim 7, wherein the second memory device includes cache lines for storing data from memory addresses in the first memory device, wherein the counter is incremented when data from the first memory device is fetched and written to one cache line in the second memory device and wherein the counter is decremented when data is removed from one cache line in the second memory device.

9. The method of claim 8, wherein there is one valid flag for each cache line indicating whether the cache line includes valid data from the first memory device, wherein the counter is incremented when the valid flag is changed from indicating invalid to indicating valid data and decremented when the valid flag is changed from indicating valid to indicating invalid data.

10. The method of claim 1, wherein the first memory device is a slower access memory device than the second memory device.

11. The method of claim 10, wherein the second memory device comprises a cache embedded in a processing unit and wherein the first memory device is external to the processing unit.

12. A system, comprising:
    a first memory device;
    a second memory device;
    circuitry, wherein the circuitry is operable to:
    (i) receive a request to data at a memory address in a first memory device, wherein data in the first memory device is cached in a second memory device;
    (ii) determine whether to fetch the requested data from the first memory device to cache in the second memory device in response to determining that the requested data is not in the second memory device; and
    (iii) access the requested data in the first memory device and bypassing the second memory device to execute the request in response to determining not to fetch the requested data from the first memory device to cache in the second memory device.

13. The system of claim 12, wherein the memory address to which the request is directed comprises a first memory address, wherein the determination to fetch the requested data from the first memory device is made in response to additionally determining that a location in the second memory device into which the fetched requested data from the first memory device is cached includes updated data for the first memory device.

14. The system of claim 12, wherein the request may comprise a request to read or write data at the memory address in the first memory device.

15. The system of claim 12, wherein the circuitry is further operable to:
    fetch the requested data from the memory address in the first memory device to cache in the second memory device in response to determining to fetch the requested data from the first memory device to the second memory device as part of executing the request.

16. The system of claim 12, wherein determining whether to fetch the requested data from the first memory device to the second memory device in response to determining that the requested data is not in the cache comprises:
    determine whether an amount of valid data from the first memory device cached in the second memory device exceeds a threshold.

17. The system of claim 16, wherein the requested data is fetched from the first memory device to the second memory device in response to determining that the amount of valid data cached in the second memory device is below the threshold and wherein the requested data is accessed in the first memory device and the second memory device bypassed when executing the request in response to determining that the amount of valid data cached in the second memory device exceeds the threshold.

18. The system of claim 16, further comprising:
a counter, wherein the circuitry is further operable to:
- (i) increment a counter whenever data is fetched from the first memory device and cached in the second memory device; and
- (ii) decrement the counter whenever data is invalidated in the second memory device, wherein determining whether the amount of valid data from the first memory device being cached in the second memory device exceeds the threshold comprises determining whether the counter exceeds the threshold and determining whether the amount of valid data in the second memory device is below the threshold comprises determining whether the counter is below the threshold.

19. The system of claim 18, wherein the second memory device includes cache lines for storing data from memory addresses in the first memory device, wherein the counter is incremented when data from the first memory device is fetched and written to one cache line in the second memory device and wherein the counter is decremented when data is removed from one cache line in the second memory device.

20. The system of claim 19, further comprising:
one valid flag for each cache line indicating whether the cache line includes valid data from the first memory device, wherein the counter is incremented when the valid flag is changed from indicating invalid to indicating valid data and decremented when the valid flag is changed from indicating valid to indicating invalid data.

21. The system of claim 12, wherein the first memory device is a slower access memory device than the second memory device.

22. The system of claim 21, wherein the second memory device comprises a cache embedded in a processing unit and wherein the first memory device is external to the processing unit.

23. A system, comprising:
processor implemented on a first integrated circuit device;
a first memory device implemented on a second integrated circuit device;
a second memory device implemented on the first integrated circuit device;
circuitry, wherein the circuitry is operable to:
- (i) receive a request to data at a memory address in a first memory device, wherein data in the first memory device is cached in a second memory device;
- (ii) determine whether to fetch the requested data from the first memory device to cache in the second memory device in response to determining that the requested data is not in the second memory device; and
- (iii) access the requested data in the first memory device and bypassing the second memory device to execute the request in response to determining not to fetch the requested data from the first memory device to cache in the second memory device.

24. The system of claim 23, wherein the memory address to which the request is directed comprises a first memory address, wherein the determination to fetch the requested data from the first memory device is made in response to additionally determining that a location in the second memory device into which the fetched requested data from the first memory device is cached includes updated data for the first memory device.

25. An article of manufacture for managing data in a first memory device and a second memory device, wherein the article of manufacture is operable to:
receive a request to data at a memory address in a first memory device, wherein data in the first memory device is cached in a second memory device;
determine whether to fetch the requested data from the first memory device to cache in the second memory device in response to determining that the requested data is not in the second memory device; and
access the requested data in the first memory device and bypassing the second memory device to execute the request in response to determining not to fetch the requested data from the first memory device to cache in the second memory device.

26. The article of manufacture of claim 25, wherein the memory address to which the request is directed comprises a first memory address, wherein the determination to fetch the requested data from the first memory device is made in response to additionally determining that a location in the second memory device into which the fetched requested data from the first memory device is cached includes updated data for the first memory device.

27. The article of manufacture of claim 25, wherein the request may comprise a request to read or write data at the memory address in the first memory device.

28. The article of manufacture of claim 25, wherein the article of manufacture is further operable to:
fetch the requested data from the memory address in the first memory device to cache in the second memory device in response to determining to fetch the requested data from the first memory device to the second memory device as part of executing the request.

29. The article of manufacture of claim 25, wherein determining whether to fetch the requested data from the first memory device to the second memory device in response to determining that the requested data is not in the cache comprises:
determining whether an amount of valid data from the first memory device cached in the second memory device exceeds a threshold.

30. The article of manufacture of claim 29, wherein the requested data is fetched from the first memory device to the second memory device in response to determining that the amount of valid data cached in the second memory device is below the threshold and wherein the requested data is accessed in the first memory device and the second memory device bypassed when executing the request in response to determining that the amount of valid data cached in the second memory device exceeds the threshold.

31. The article of manufacture of claim 29, wherein the article of manufacture is further operable to:
increment a counter whenever data is fetched from the first memory device and cached in the second memory device; and
decrement the counter whenever data is invalidated in the second memory device, wherein determining whether the amount of valid data from the first memory device being cached in the second memory device exceeds the threshold comprises determining whether the counter exceeds the threshold and determining whether the amount of valid data in the second memory device is below the threshold comprises determining whether the counter is below the threshold.

32. The article of manufacture of claim 31, wherein the second memory device includes cache lines for storing data from memory addresses in the first memory device, wherein the counter is incremented when data from the first memory device is fetched and written to one cache line in the second memory device and wherein the counter is decremented when data is removed from one cache line in the second memory device.

33. The article of manufacture of claim 32, wherein there is one valid flag for each cache line indicating whether the cache line includes valid data from the first memory device, wherein the counter is incremented when the valid flag is changed from indicating invalid to indicating valid data and decremented when the valid flag is changed from indicating valid to indicating invalid data.

34. The article of manufacture of claim 25, wherein the first memory device is a slower access memory device than the second memory device.

35. The article of manufacture of claim 34, wherein the second memory device comprises a cache embedded in a processing unit and wherein the first memory device is external to the processing unit.

* * * * *